United States Patent [19]

Cuevas

[11] Patent Number: 5,685,558
[45] Date of Patent: Nov. 11, 1997

[54] AIR BAG INFLATOR MOUNTING

[75] Inventor: Jess A. Cuevas, Scottsdale, Ariz.

[73] Assignee: TRW Inc., Lyndhurst, Ohio

[21] Appl. No.: 597,280

[22] Filed: Feb. 6, 1996

[51] Int. Cl.$^6$ ................................................. B60R 21/16
[52] U.S. Cl. ..................... 280/728.2; 280/731; 280/737
[58] Field of Search ......................... 280/728.2, 731, 280/732, 741, 737

[56] References Cited

U.S. PATENT DOCUMENTS

| | | |
|---|---|---|
| 3,525,536 | 8/1970 | Pruneski . |
| 4,449,728 | 5/1984 | Pilatzki ........................ 280/731 |
| 5,320,379 | 6/1994 | Burnard et al. ............... 280/731 |
| 5,380,037 | 1/1995 | Worell et al. ................. 280/728.2 |
| 5,470,100 | 11/1995 | Gordon ......................... 280/731 |
| 5,577,762 | 11/1996 | Hagen et al. ................. 280/728.2 |

FOREIGN PATENT DOCUMENTS

| | | | |
|---|---|---|---|
| 5-286401 | 11/1993 | Japan | ................. 280/728.2 |

*Primary Examiner*—Paul N. Dickson
*Attorney, Agent, or Firm*—Tarolli, Sundheim, Covell, Tummino & Szabo

[57] ABSTRACT

An apparatus for helping to protect an occupant of a vehicle comprises a plate (40) which is attachable to a vehicle steering wheel (22). A post (106) is fixed to the plate (40) and extends from the plate. The post (106) has an opening (108). An inflatable vehicle occupant protection device (42) is attached to the plate (40). The protection device (42), upon inflation, helps protect the occupant of the vehicle from forcefully striking a part of the vehicle. An actuatable inflator (44) is attached to the plate (40) and provides, upon actuation, inflation fluid to inflate the protection device (42). The inflator (44) includes a base (142) having a surface (260) defining a slot (262) for receiving the post (106). The base (142) of the inflator (44) further includes a surface defining a passage (264) communicating with the slot (262) in the base. A pin (280) extends through the passage (264) in the base (142) of the inflator (44) and into the opening (108) in the post (106) to inhibit movement of the inflator (44) relative to the plate (40).

10 Claims, 3 Drawing Sheets

AIR BAG INFLATOR MOUNTING

BACKGROUND OF THE INVENTION

1. Technical Field

The present invention relates to an inflatable vehicle occupant protection device, such as an air bag. In particular, the present invention relates to structure for mounting an air bag inflator to a vehicle steering wheel.

2. Description of the Prior Art

One type of inflatable vehicle occupant protection device, commonly referred to as an air bag, is used for protecting an operator of a vehicle upon inflation. An actuatable inflator provides a source of inflation fluid for, upon actuation, inflating the air bag. The air bag and inflator are typically mounted to a mounting plate which is attached to a part of a vehicle, such as a vehicle steering wheel.

The air bag, inflator and mounting plate may be parts of an air bag module. The module is typically attached to the steering wheel as a unit after the steering wheel is installed in the vehicle. Attaching the air bag and inflator to the mounting plate can be difficult even before the mounting plate is attached to the steering wheel. The difficulty arises when fasteners, such as rivets, nuts, bolts and screws, which are typically used to attach the air bag and inflator to the mounting plate must be aligned with various openings in those parts.

SUMMARY OF THE INVENTION

The present invention is directed to an apparatus for use in a vehicle to help protect a vehicle operator. The apparatus comprises a plate having a first post which is fixed to the plate and which extends from the plate. The first post includes an opening. An inflatable vehicle occupant protection device is attachable to the plate. The protection device, upon inflation, extends from the steering wheel to help protect an operator of the vehicle from forcefully striking a part of the vehicle. An actuatable inflator provides, upon actuation, inflation fluid to inflate the protection device.

The inflator includes a base. Surface means of the base defines a first slot for receiving the first post. The base of the inflator further includes surface means which defines a passage communicating with the first slot in the base. A pin extends through the passage in the base of the inflator and into the opening in the first post of the plate to inhibit movement of the inflator relative to the plate.

The vehicle has a steering shaft. The first post extends transversely from the plate and in a direction substantially parallel to the steering shaft. The passage extends into the base from opposite sides of the first slot. The pin extends through opposite sides of the first post to attach the base of the inflator to the first post at two locations on opposite sides of the first slot. A steering wheel is attached to the steering shaft. An annular protective ring is attached to the plate and extend from the plate. The annular protective ring encircles the protection device to shield the protection device from damage during attachment of the plate to the steering wheel.

The surface means of the base of the inflator also defines a second slot in the base. The first and second slots are spaced apart and extend parallel to each other. The slots extend through the base in a direction transverse to a longitudinal central axis of the inflator. The plate further includes a second post extending parallel to the first post and received in the second slot in the base of the inflator.

The inflator is preferably an actuatable dual stage inflator for inflating a vehicle occupant protection device mounted on a vehicle steering wheel which is attached to a vehicle steering shaft. The inflator includes an elongate cylindrical container fixed to the base. The inflator is supported by the first post so the longitudinal central axis of the container extends transverse to the first post. The container defines a chamber for holding an inflation fluid under pressure. The container has an opening through which the inflation fluid can flow to inflate the vehicle occupant protection device. A rupturable first closure extends across the opening to block fluid flow. The first closure ruptures when pressure in the chamber increases to a predetermined pressure.

Surface means defines a pair of combustion chambers in the base. Ignitable material and an igniter are located in each combustion chamber. The base has flow openings for communicating each combustion chamber with the inflation fluid holding chamber. Rupturable second and third closures block the flow openings in the base.

A first one of the igniters is actuated to ignite the ignitable material in a first one of the combustion chambers to rupture the second closure. The flow opening for the first combustion chamber allows combustion products from ignition of the ignitable material to flow into the inflation fluid holding chamber. The inflation fluid is heated by the combustion products to increase the pressure in the inflation fluid holding chamber to the predetermined pressure and rupture the first closure. Inflation fluid can flow through the opening in the container.

A second one of the igniters is actuated to ignite the ignitable material in a second one of the combustion chambers to rupture the third closure. The flow opening for the second combustion chamber allows combustion products from ignition of the ignitable material to flow into the inflation fluid holding chamber to further heat the inflation fluid.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF PREFERRED EMBODIMENTS

Figure 1:
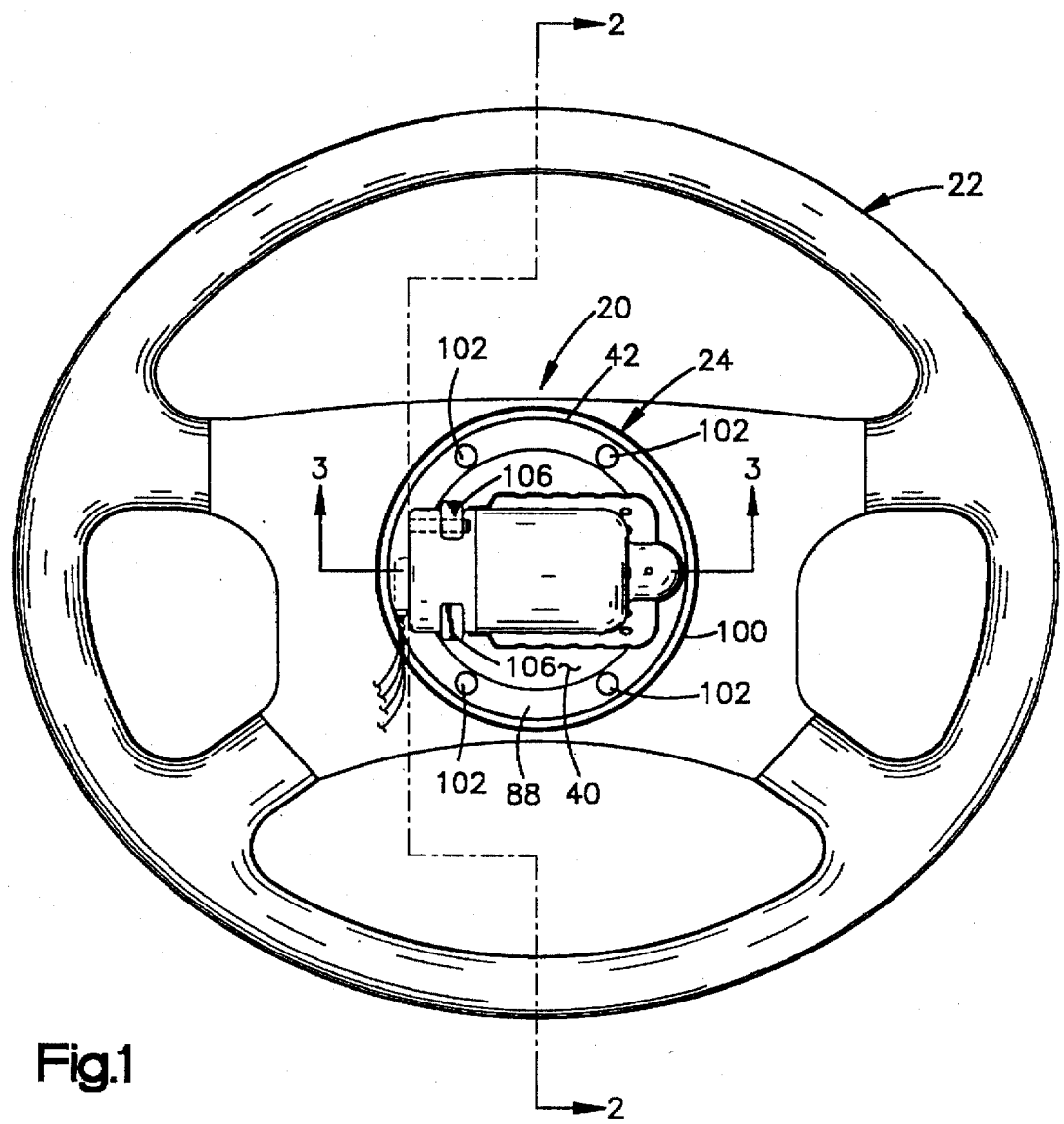
FIG. 1 is a schematic view of an inflator mounting according to the present invention.
Figure 2:
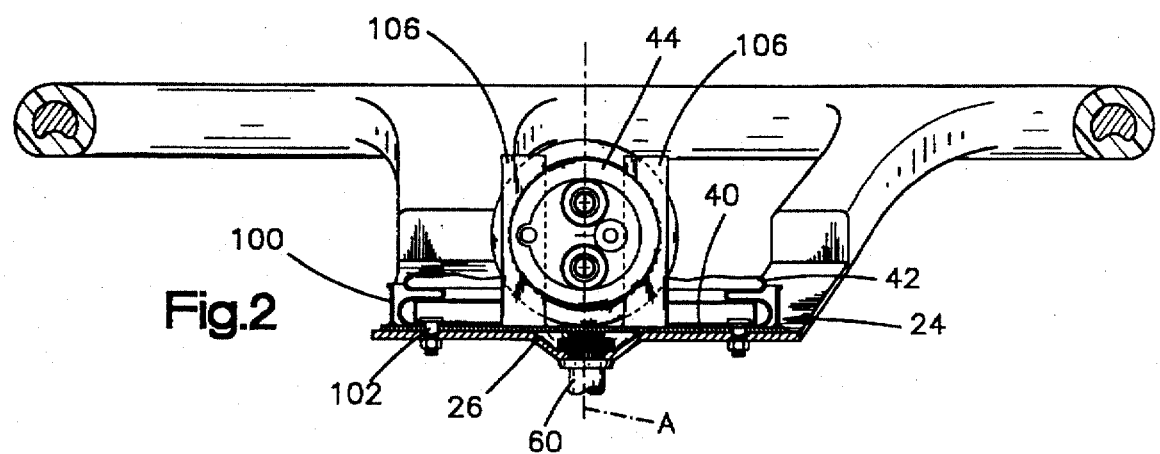
FIG. 2 is a sectional view of the mounting of FIG. 1, taken approximately along the line 2—2 in FIG. 1.

A vehicle occupant protection system 20 is illustrated in FIG. 1 mounted to a vehicle steering wheel 22. The vehicle occupant protection system 20 includes an air bag module 24. The air bag module 24 is connected to a support plate 26 (FIG. 2) of the vehicle steering wheel 22. The air bag module 24 includes a mounting plate 40, an inflatable vehicle occupant protection device which is commonly referred to as an air bag 42, and an actuatable inflator 44.

When actuated, the inflator 44 provides inflation fluid for inflating the air bag 42. The inflator 44 (FIG. 3) preferably contains a stored quantity of pressurized fluid and ignitable material for heating the stored fluid. The inflator 44 may alternately contain an ignitable gas generating material which, when ignited, rapidly generates a large volume of gas.

The air bag 42 is inflatable from an uninflated and stored condition inside a central portion of the steering wheel 22. Upon inflation, the air bag 42 extends from the steering wheel 22 into the vehicle occupant compartment adjacent the steering wheel. The inflated air bag 42 cushions and restrains movement of the vehicle occupant in a direction toward the steering wheel 22. The inflated air bag 42 thus helps protect the occupant from forceful impact with the steering wheel 22 and other parts of the vehicle near the steering wheel.

Figure 5:
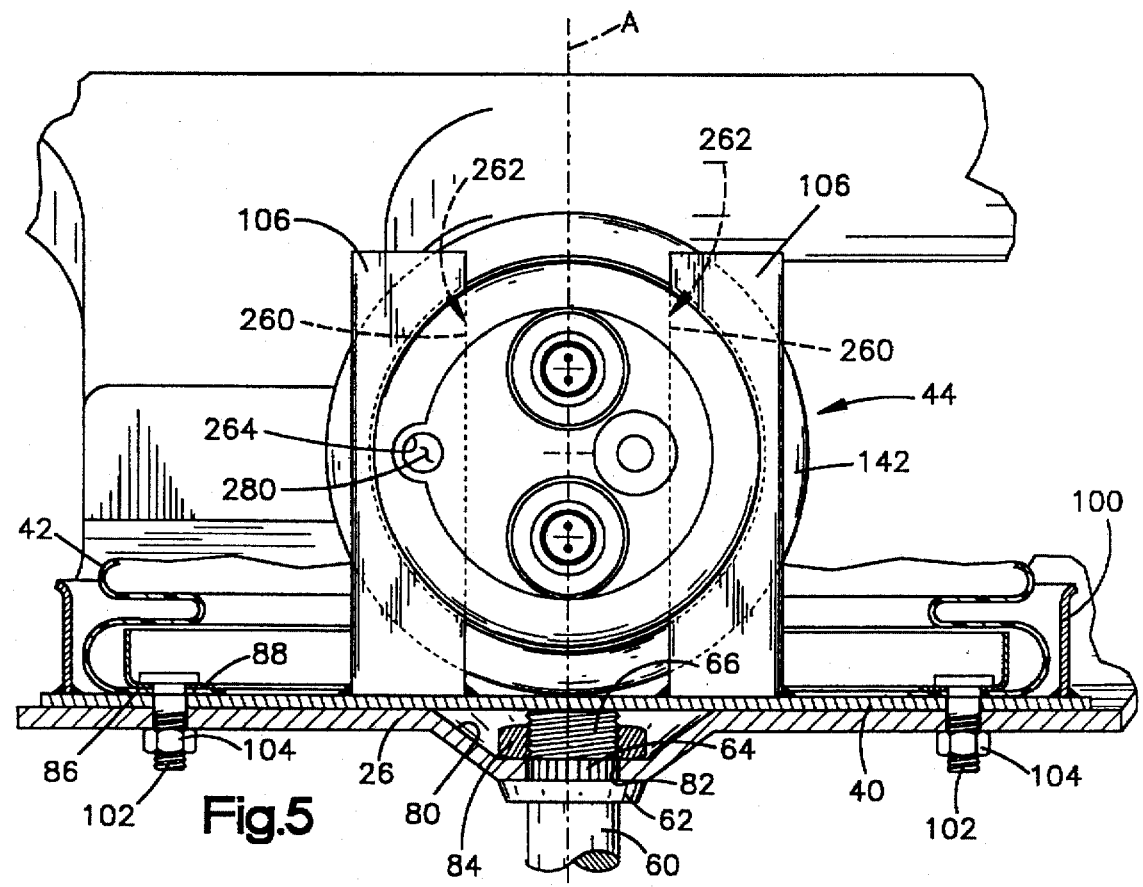
FIG. 5 is a view of the mounting, taken approximately along the line 5—5 in FIG. 4.

The vehicle includes a steering shaft 60 (FIGS. 2 and 5) which has a longitudinal central axis A. The steering shaft 60 is rotatable about the axis A to control steerable wheels of the vehicle. The steering shaft 60 includes a flange 62 (FIG. 5) extending radially from the steering shaft, an axially extending spline 64 located adjacent the flange and a thread 66 located adjacent the spline.

The support plate 26 includes a recess 80 with a central opening 82. The spline 64 of the steering shaft 60 is received in the opening 82 so that the surface of the support plate 26 which defines the opening frictionally engages the spline. A lower surface of the recess 80 in the support plate 62, as viewed in FIG. 5, rests against the flange 62 of the steering shaft 60. A nut 84 is screwed on the thread 66 and tightened against an upper surface of the recess 80 in the support plate 26 to fix the support plate to the steering shaft 60 for joint rotation about the axis A.

The mounting plate 40 of the air bag module 24 is metal and substantially planar. A mounting portion 86 of the air bag 42, which defines an inlet opening of the air bag, is clamped against the mounting plate 40 by a retainer ring 88. Four studs 102 extend downward through the retainer ring 88, the mounting portion 86 of the air bag 42, and the mounting plate 40, as viewed in FIG. 5. The studs 102 extend through openings in the support plate 26. Nuts 104 are screwed onto the studs 102 and tightened against the support plate 26 to mount the air bag module 24 to the support plate 26 of the steering wheel 22.

Figure 4:
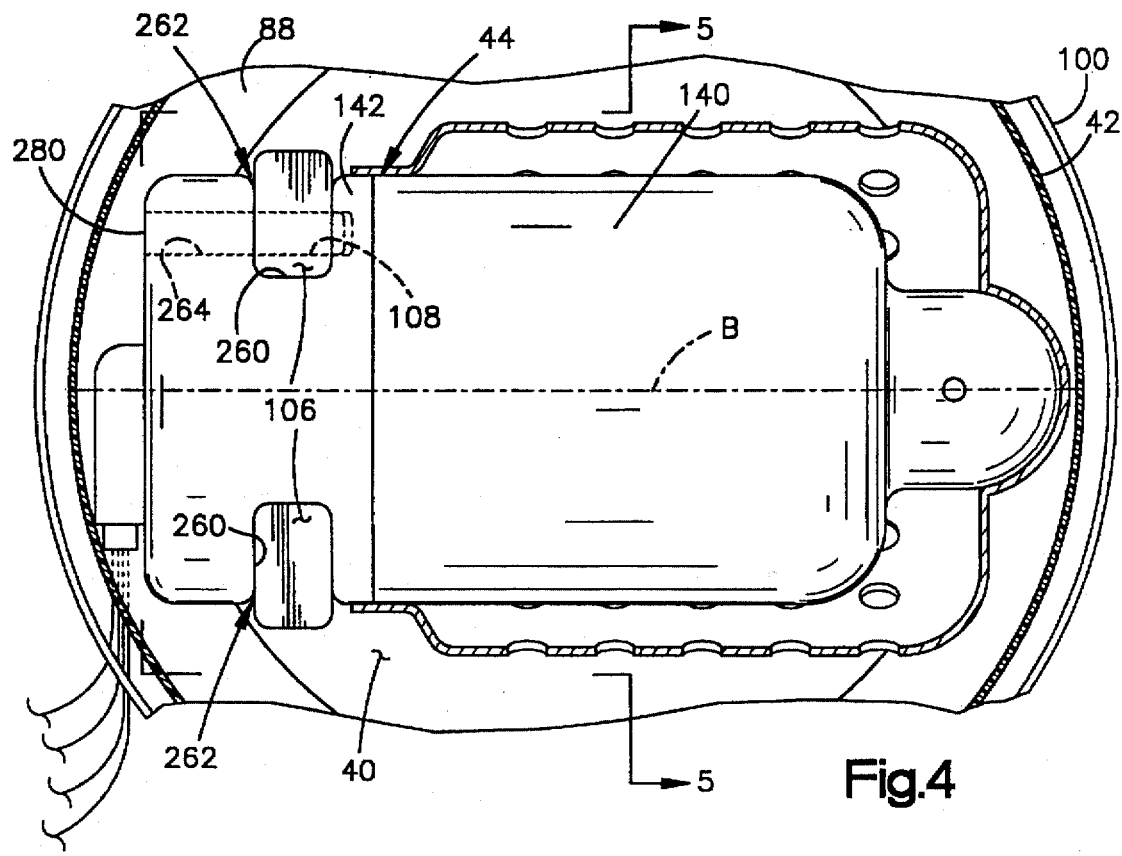
FIG. 4 is an enlarged plan view with parts in section of a portion of the mounting of FIG. 1.

The mounting plate 40 (FIGS. 4 and 5) includes an annular protective ring 100 which extends from the mounting plate 40 in a direction parallel to the axis A when the mounting plate is attached to the support plate 26. The annular protective ring 100 is preferably welded to the mounting plate. The annular protective ring 100 protects the mounting portion 86 of the air bag 42 from damage during assembly or insertion of the air bag module 24 into the steering wheel 22. For example, when the air bag module 24 is inserted into the central portion of the steering wheel 22, the protective ring 100 prevents side edges of the air bag module, such as the mounting portion 86 of the air bag 42, from contacting parts of the steering wheel 22.

A pair of posts 106 (FIGS. 4 and 5) are fixedly attached to the mounting plate 40 and extend in a direction normal to the plane containing the mounting plate. The posts 106 are preferably made from metal and are welded to the mounting plate 40. The posts 106 are adapted to extend substantially parallel to the longitudinal axis A of the steering shaft 60 when the mounting plate 40 of the air bag module 24 is attached to the support plate 26 of the steering wheel 22. The upper post 106, as viewed in FIG. 4, includes an opening 108 extending through two opposite sides of the post.

The vehicle occupant protection system 20 includes an electrical actuation circuit 120 (FIG. 3) which is connected to the inflator 44 by wires 121. The electrical actuation circuit 120 includes a power source 122 which is preferably a battery or a capacitor in the vehicle and a normally open switch 124. The switch 124 is part of a sensor 126 which senses a condition indicating the occurrence of a vehicle situation, such as a collision, which requires inflation of the air bag 42. If the collision or vehicle situation is above a predetermined threshold, the inflator 44 is actuated by the electrical actuation circuit 120 to inflate the air bag 42. A controller 128 is provided in the electrical actuation circuit 120 to control actuation of the inflator 44.

The inflator 44 (FIG. 3) is preferably an actuatable dual stage type of inflator which is attached to the mounting plate 40. The inflator 44 has an elongate cylindrical shape with a longitudinal central axis B. The longitudinal central axis B of the inflator 44 extends transversely to the axis A of the steering shaft 60 when the air bag module 24 is mounted to the steering wheel 22.

The inflator 40 includes a metal container 140 and a metal base 142. The container 140 is preferably friction welded to the base 142. The container 140 and base 142 cooperate to define a chamber 144 for holding an inert inflation fluid, such as argon, nitrogen or a mixture of argon and nitrogen, under pressure. The container 140 has an opening 160 through which the inflation fluid can flow into a diffuser chamber portion 162 of the container 140. Discharge openings 164 extend through the diffuser chamber portion 162. Inflation fluid can flow through the discharge openings 164 to inflate the air bag 42.

A rupturable closure 166 extends across the opening 160 in the container 140 to block the flow of inflation fluid through the opening. The closure 166 is made from a thin metal and ruptures when the pressure of the inflation fluid in the chamber 144 increases to a predetermined pressure above the pressure at which the inflation fluid is stored. When the closure 166 ruptures, the inflation fluid is free to flow into the diffuser chamber portion 162 and through the discharge openings 164.

Figure 3:
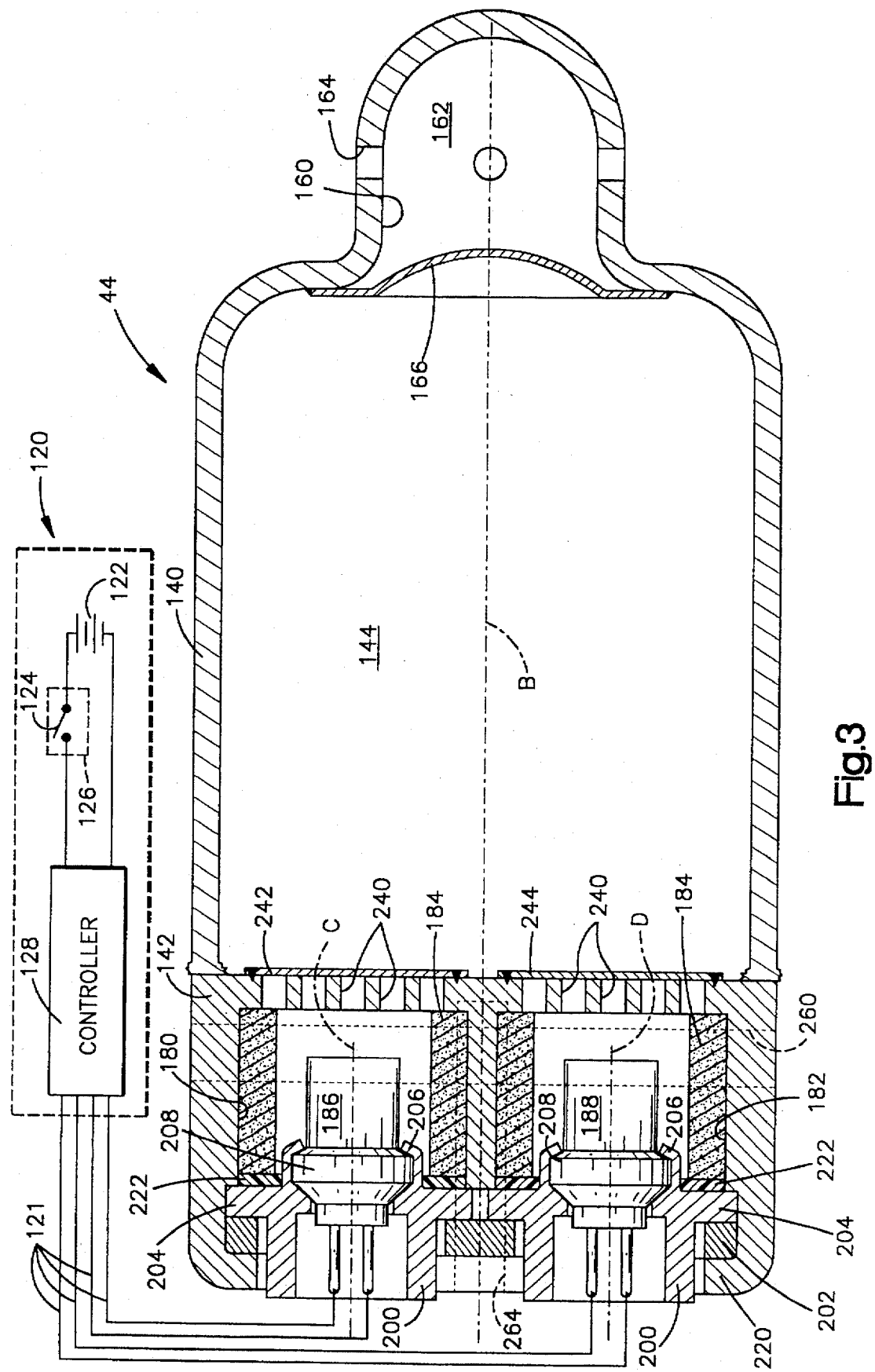
FIG. 3 is an enlarged schematic sectional view of the inflator of FIG. 1, taken approximately along the line 3—3 in FIG. 1.

The base 142 includes a pair of combustion chambers 180, 182 which are radially spaced from the axis B, as illustrated in FIG. 3. The combustion chambers 180, 182 are elongate cylinders and have respective longitudinal central axes C, D which extend in a direction parallel to the longitudinal central axis B of the inflator 44. A quantity of ignitable material 184 is located in each of the combustion chambers 180, 182. The ignitable material 184 is preferably tubular with an outside diameter that fits tightly within the combustion chambers 180, 182.

Igniters 186, 188 are located within the tubular ignitable material 184 in the combustion chambers 180, 182, respectively. The igniters 186, 188 are retained in position in the combustion chambers 180, 182 by holders 200 and an end plate 202. Each holder 200 has an annular flange 204 that extends radially outward from the main body of the holder and is larger in diameter than its associated combustion chamber 180, 182. Each of the igniters 186, 188 is held in its respective holder 200 by an end portion 206 of the holder crimped over an enlarged central portion 208 of the igniter.

The end plate 202 is located axially outward of but overlies the flanges 204 of the igniters 186, 188. An end portion 220 of the base 142 is bent over the end plate 202 to hold the end plate in the base. An elastomeric washer 222 is located in each combustion chamber 180, 182 between the ignitable material 184 and the associated holder 200. The washer 222 can compress during assembly of the base 142 to assure that no clearance occurs between the ignitable material 184 and opposite ends of the combustion chambers 180, 182.

The base 142 also includes flow openings 240 extending between the chamber 144 and the combustion chambers 180, 182. The flow openings 240 are associated with each of the combustion chambers 180, 182 for communicating the individual combustion chamber with the chamber 144. Rupturable closures 242, 244 are attached to the base 142, preferably by laser welding, to block all of the flow openings 240 in the base 142. Closure 242 blocks all of the flow openings 240 communicating with the combustion chamber 180. Closure 244 blocks all of the flow openings 240 communicating with the combustion chamber 182. Thus, the chamber 144 is hermetically sealed from the openings 160, 240 at opposite ends of the container 140.

The base 142 of the inflator 44 has surfaces 260 (FIGS. 4 and 5) defining a pair of slots 262 extending in a direction perpendicular to the axis B of the inflator through radially outer portions of the base. The slots 262 are spaced radially outward from the combustion chambers 180, 182. The base 142 also includes a passage 264 which has a circular cross-section and extends through one of the slots 262 in a direction parallel to the axis B. The passage 264 extends from the left end of the base 142, as viewed in FIGS. 3 and 4. The passage 264 extends through the base 142 beyond the upper slot 262, as viewed in FIG. 4.

The slots 262 receive the posts 106 on the mounting plate 40 to inhibit movement of the inflator 44 relative to the mounting plate and the steering wheel 22 in a direction parallel to the axis B and a plane which contains the mounting plate. The surfaces 260 that define the slots 262 fit tightly against the posts 106. A pin 280 extends into the passage 264 in the base 142 and into the opening 108 in the upper post 106, as viewed in FIG. 5. The upper post 106, pin 280 and base 142 thus cooperate to inhibit movement of the inflator 44 in a direction along the post and normal to the mounting plate 40. After the inflator 44 is mounted to the module plate 40, the air bag 42 is attached to the module plate.

The air bag module 24 is preferably attached to the vehicle steering wheel 22 after the steering wheel is connected to the steering shaft 26 and installed in a vehicle. The air bag module 24 may also be installed into the steering wheel 22 prior to the steering wheel being attached to the steering shaft 26. The air bag module 24 of the present invention provides relative ease of installation and mounting to the steering wheel 22. The air bag module 24 also provides all of the elements needed to protect the operator of the vehicle during a collision for installation as a unit and which requires only a plug-in connection to actuation circuitry.

In operation, when the vehicle is subjected to sudden deceleration, such as occurs during a collision from a predetermined range of directions, the sensor 126 in the electrical actuation circuit 120 closes the switch 124. Electrical energy is applied to the controller 128. The controller 128 determines if one or both of the igniters 186, 188 are to be energized. The controller 128 also determines if any time delay and how much of a time delay is required between energizing both of the igniters 186, 188.

Upon electrical energization of the igniter 186, the ignitable material 184 in the combustion chamber 180 ignites. The pressure in the combustion chamber 180 increases due to combustion products being produced by ignition of the ignitable material 184. The closure 242 ruptures to open the flow openings 240 extending from the combustion chamber 180 and release the combustion products into the chamber 144.

The combustion products flow from the combustion chamber 180, through the flow openings 240 and into the chamber 144 to heat the inflation fluid stored in the chamber. When the pressure in the chamber 144 increases from the stored pressure to the predetermined pressure, the closure 166 ruptures. Inflation fluid is released into the diffuser chamber portion 162 to flow through the discharge openings 164 and inflate the air bag 42.

The igniter 188 in the combustion chamber 182 may be electrically energized, concurrently with or after energization of the igniter 186 in the combustion chamber 180, to ignite the ignitable material 184 in the combustion chamber 182. Ignition of the ignitable material 184 produces combustion products which increase the pressure inside the combustion chamber 182 to rupture the closure 244. The combustion products flow from the combustion chamber 182, through the flow openings 240 and into the chamber 144 to heat the inflation fluid further. It will be apparent that the igniter 188 may not be energized, as determined by the controller 128.

The air bag 42 is inflated in a manner that is determined to be desirable by the controller 128. The controller 128 can provide a pressure profile in the air bag 42 as a function of predetermined requirements or variables which occur during the collision. The pressure profile is pressure within the air bag 42 over the duration of time during which inflation of the air bag occurs. The variables input to the controller 128 may be any one or more of various parameters, such as the location of an operator, the weight distribution on the driver's seat and/or distance that the torso of the operator is located from the steering wheel 22. Other variables may be speed of the vehicle when the collision occurs, the severity of the collision and/or temperature within the occupant compartment.

From the above description of the invention, those skilled in the art will perceive improvements, changes and modifications. For example, the air bag module 24 could be mounted in a vehicle in positions other than a steering wheel 22, such as a vehicle instrument panel, vehicle seat, or vehicle door. Similarly, the inflator 44 need not be a dual stage inflator, but could be any type of inflator to provide inflation fluid to inflate the air bag 42. Such improvements, changes and modifications within the skill of the art are intended to be covered by the appended claims.

Having described the invention, the following is claimed:

1. An apparatus for use in a vehicle, said apparatus comprising:

a plate having a first post fixed to said plate and extending from said plate, said first post including an opening;

an inflatable vehicle occupant protection device attachable to said plate, said protection device, upon inflation, helping protect an occupant of the vehicle from forcefully striking a part of the vehicle;

an actuatable inflator which provides, upon actuation, inflation fluid to inflate said protection device, said inflator including a base with surface means for defining a first slot receiving said first post, said base of said inflator further including means for defining a passage communicating with said first slot in said base; and a pin extending through the passage in said base of said inflator and into the opening in said first post of said plate to inhibit movement of said inflator relative to said plate.

2. The apparatus of claim 1 wherein said surface means of said base further defines a second slot in said base, said first and second slots being spaced apart and extending parallel to each other in a direction transverse to a longitudinal central axis of said inflator, said plate further including a second post extending parallel to said first post and being received in said second slot in said base of said inflator.

3. The apparatus of claim 1 wherein the passage in said base extends into said base from opposite sides of said first slot and said pin extends through the opening in said first post and into said base on opposite sides of said first slot.

4. The apparatus of claim 1 wherein the apparatus has a steering shaft and said first post extends transversely from said plate and in a direction substantially parallel to the steering shaft.

5. The apparatus of claim 1 wherein said inflator comprises an elongate container supported with a longitudinal central axis of said container extending in a direction transverse to the direction said first post extends from said plate.

6. The apparatus of claim 1 wherein the vehicle has a steering wheel and a steering shaft and further including an annular protective ring attached to said plate, said protective ring extending from said plate and encircling said protection device to protect said protection device from damage during attachment of said plate to one of the steering wheel and steering shaft.

7. An apparatus for protecting an operator of a vehicle having a steering wheel connected to a steering shaft, said apparatus comprising:

an inflatable vehicle occupant protection device which when inflated is positionable between the steering wheel and the operator of the vehicle;

an actuatable inflator which provides inflation fluid to inflate said protection device, said inflator including a base having a surface defining a slot and a surface defining a passage in said base of said inflator, the passage communicating with the slot; and means for attaching said base of said inflator to the steering wheel, said attaching means comprising:

a mounting plate connectable with a vehicle steering wheel, said protection device being attachable to said mounting plate;

a post fixed to said mounting plate and located in the slot in said base of said inflator, said post having an opening; and a pin extendable through the passage in said base of said inflator and into the opening in said post to inhibit movement of said inflator relative to said post.

8. The apparatus of claim 7 wherein the passage extends into said base from opposite sides of the slot in said base and said pin extends through said post and into said base on opposite sides of said slot.

9. The apparatus of claim 7 wherein said post extends in a direction substantially parallel to the steering shaft when attached to the steering wheel.

10. An apparatus for inflating a vehicle occupant protection device mounted on a vehicle steering wheel attached to a vehicle steering shaft, said apparatus comprising:

a plate connectable with the steering wheel;

a pair of parallel posts extending from said plate, at least one of said posts including an opening;

an actuatable dual stage inflator including a container having an elongate cylindrical shape and a base, said container defining a chamber for holding an inflation fluid, said container having an opening through which inflation fluid can flow to inflate the vehicle occupant protection device;

a rupturable first closure blocking fluid flow through the opening in said container and rupturing when pressure of the inflation fluid in the chamber increases to a predetermined pressure;

said base defining a pair of combustion chambers, ignitable material and a respective one of a pair of igniters being located in each combustion chamber, said base having flow openings, at least one flow opening communicating a respective combustion chamber with the inflation fluid chamber;

second and third closures blocking the flow openings in said base;

said base of said inflator including a pair of slots for receiving said pair of posts of said plate to attach said inflator to said plate and inhibit movement of said inflator relative to said plate in a direction normal to said posts, said base of said inflator further including surface means defining a passage which extends into one of the slots;

a pin extendable through the passage in said base of said inflator and into the opening in said at least one post of said plate to inhibit movement of said inflator relative to said plate in a direction parallel to said posts;

a first one of said igniters being actuated to ignite said ignitable material in a first one of said combustion chambers to rupture said second closure which blocks the flow opening communicating with the first combustion chamber to allow combustion products from ignition of said ignitable material to flow into the inflation fluid holding chamber and heat the inflation fluid to increase the pressure in the inflation fluid holding chamber to the predetermined pressure and rupture said first closure to permit fluid flow through the opening in said container; and a second one of said igniters being actuated to ignite said ignitable material in a second one of said combustion chambers to rupture said third closure blocks the flow opening communicating with the second combustion chamber to allow combustion products from ignition of said ignitable material to flow into the inflation fluid holding chamber to further heat the inflation fluid.

* * * * *